UNITED STATES PATENT OFFICE.

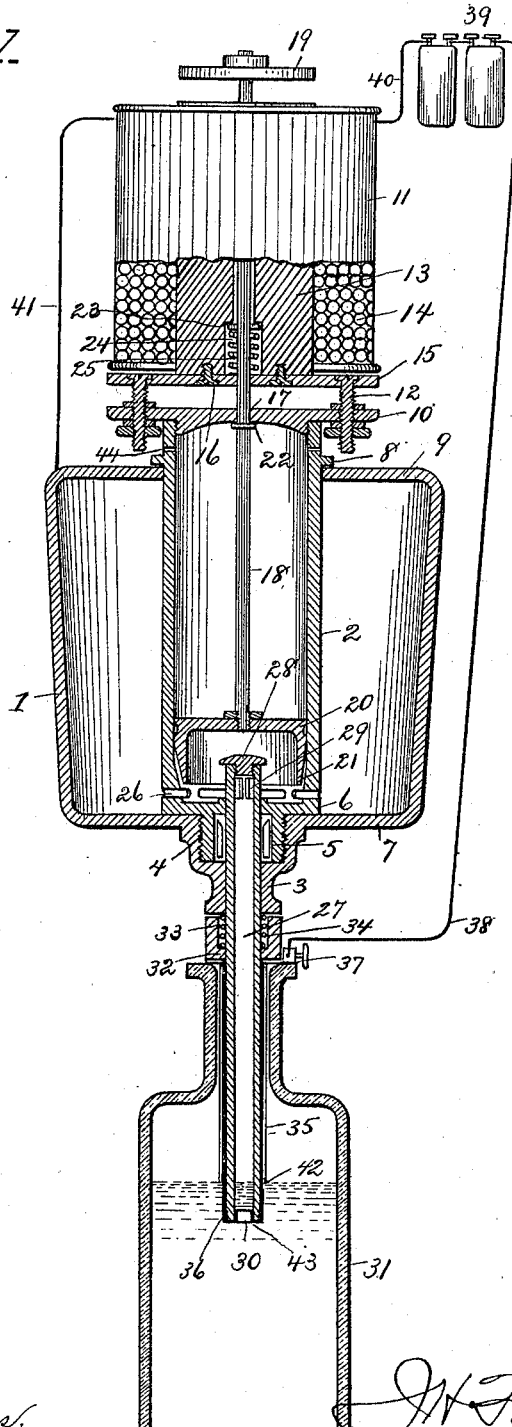

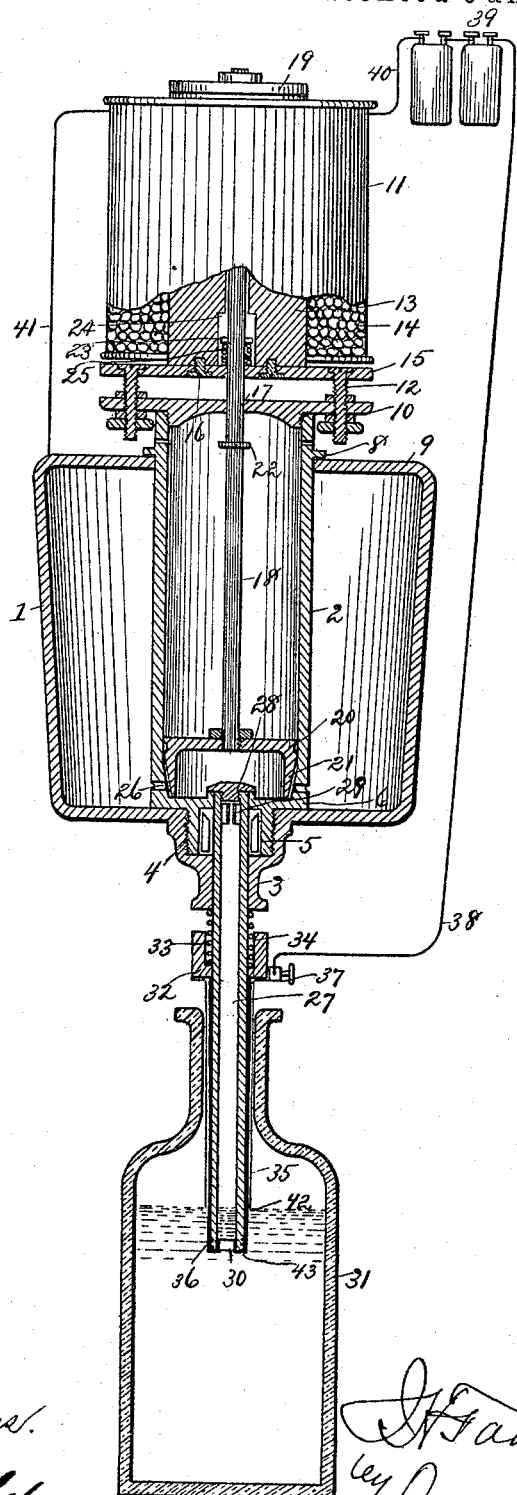

JOSIAH HARVEY FAHRNEY, OF CHICAGO, ILLINOIS.

APPARATUS FOR FILLING BOTTLES.

SPECIFICATION forming part of Letters Patent No. 585,264, dated June 29, 1897.

Application filed October 8, 1895. Serial No. 564,984. (No model.)

*To all whom it may concern:*

Be it known that I, JOSIAH HARVEY FAHRNEY, a citizen of the United States, residing in the city of Chicago, in the county of Cook and State of Illinois, have invented certain new and useful Improvements in Apparatus for Filling Bottles, of which the following is a full, clear, and exact description, reference being had to the accompanying drawings, forming a part of this specification.

My invention relates to apparatus for filling bottles.

The prime object of my invention is to provide mechanism which shall operate automatically to fill a bottle to a predetermined height, thus avoiding waste of the liquid being bottled.

A further object of my invention is to provide improved mechanism for controlling the flow of liquid from the reservoir, for effecting the automatic closing of the filling-tube, for utilizing the liquid in the bottle being filled to close an electric circuit, and for completing the filling of the bottle by means of the filling-tube after the closing of the reservoir-valve.

The foregoing and such other objects as may occur from the ensuing description are attained by the mechanism illustrated in the accompanying drawings, in which—

Figure 1 is a central vertical section of the apparatus embodying my invention, the valve of the reservoir being in raised or open position. Fig. 2 is a similar view illustrating the parts of the apparatus in the positions they assume when the liquid-supply is cut off from the reservoir.

The reference-numeral 1 indicates the liquid-reservoir, which may be of cylindrical or other suitable form, and is provided with a central longitudinal valve-casing tube. I preferably construct the reservoir 1 and casing 2 as shown in the drawings, the reservoir having a depending sleeve 3, formed with an internally-threaded socket 4, while the valve-casing is provided at its lower end with an externally-threaded tubular ring or collar 5, fitting into the socket 4.

The casing 2 is preferably cylindrical and its base 6 rests upon the bottom 7 of the reservoir. The upper end of the casing is provided with an annular flange 8, which rests upon the top 9 of the reservoir, said top having an opening through which the casing extends. The upper end of the casing is internally threaded to receive a cover 10, threaded to screw onto the casing and extended annularly beyond the casing to support an electromagnet 11, which is secured by screws 12. The magnet 11 is of the solenoid type, comprising a hollow soft-metal core 13, wire coils 14, and a base-plate 15, secured to the core 13 by screws 16 and to the cover of the valve-casing by the screws 12.

The cover 10 of the casing is provided with a central opening 17 in vertical alinement with the opening in the core 13 to accommodate the valve-rod 18. This rod extends through the core 13 and casing 2 and is provided at its upper end with a disk-armature 19 and at its lower end with a cup-valve 20, the outer face of the latter being annularly beveled to fit the bevel-seat 21, formed at the bottom of the casing 2. A collar 22 is fixed upon the rod 18 below the cover 10 to limit its upward movement. A second collar 23 is fixed upon the rod 18 within the core 13, said core being recessed at the point 24 to receive said collar 23, and a retracting coil-spring 25, surrounding the rod 18 between its collar 23 and the base-plate 15 of the magnet.

The casing 2 is formed with a series of openings 26 to allow the liquid to pass from the reservoir 1 into the casing 2 and thence into the filling-tube 27. This tube 27 is closed at its upper end by a plug-cap 28 and is formed just below said plug with openings 29 equal in area to the openings 26 in the casing 2. The cap 28 serves as a valve to close the opening in the base of the casing 2. Said tube 27 extends through an opening in the base of the casing 2 and through the ring 5 and sleeve 3, and is open at its lower end 30 to deliver liquid to the bottle 31.

An annular shoulder 32 is fixed upon the tube 27 and provided with an annular upwardly-projecting flange 33 to constitute a seat for a coil-spring 34, the lower end of which rests upon the shoulder 32 and the upper end against the lower end of the depending sleeve 3 of the reservoir. Depending from the shoulder 32 of the filling-tube and secured thereto is an outer tube 35, slightly shorter than the filling-tube 27, which it surrounds.

The two tubes 27 and 35 are insulated from each other by an interposed sleeve 36, of rubber or other non-conducting material. The outer tube 35 is provided with a binding-post 37, which is connected electrically by a wire 38 with the positive pole of a battery 39. The other pole of the battery is electrically connected with the filling-tube 27 through a wire 40, the coils of the magnet 14, a wire 41, and the metallic reservoir 1.

The lower ends of the tubes 35 and 27 are each provided with an annular tip or ferrule 42 and 43 of platinum, which serve as the terminals or contact-points of the two poles of the battery.

The operation of the mechanism thus described is as follows: Normally the filling-tube 27 is in the position shown in Fig. 2, its cap 28 closing the opening in the bottom of the valve-casing, and the valve 20 and its rod are in the position shown in Fig. 1. By inserting the tubes 27 and 35 into the mouth of the bottle 31 and pressing the bottle upwardly against the shoulder 32 the tubes are raised to the position shown in Fig. 1. The liquid in the reservoir then passes freely into the casing 2 through the openings 26 and thence through the openings 29 into the filling-tube. As soon as the liquid reaches the point 42 (the space between the points 42 and 43 constituting the break in the electric circuit) the circuit is completed through the liquid. The magnet 11 is thus energized and attracts the armature 19, with the result of depressing the rod 18 and closing the openings 26 by the valve 20. The withdrawal of the bottle again breaks the circuits and the spring 25 raises the valve 20. At the same time the spring 34 forces the filling-tube down until its cap 28 closes the opening in the base 6 of the casing 2. The tube 27 is thus self-closing. It will be clear that at the time of cutting off the flow from the reservoir in the manner described by the automatic operation of the valve mechanism the tube 27 will be filled with liquid, and this quantity of liquid it is designed to have just complete the filling of the bottle, it being obvious that only a partial filling is accomplished before the valve 20 is closed. By properly regulating the diameter and length of the filling-tube with relation to bottles of different size the quantity of liquid remaining in the tube after the closing of the valve can be made to just fill the bottle without waste.

To prevent compression of the air in casing 2, openings 44 are formed therein near its upper end.

It will be understood that a slight departure from the exact details as herein before set forth may be resorted to without departing from the spirit of my invention.

Having thus described my invention, what I claim, and desire to secure by Letters Patent, is—

1. In an apparatus for filling bottles, the combination with a reservoir, of a hollow casing arranged within the reservoir, a valve operating in said casing and adapted to close a series of openings therein to prevent the flow of liquid from the reservoir into the casing, said casing being extended through an opening in the upper part of the reservoir and provided with an annular flange adapted to rest upon the reservoir, a cover secured to the upper end of the casing and extended annularly beyond the casing, an electromagnet supported on said cover to operate said valve and provided with a base-plate, and screws securing said base-plate and cover together, substantially as described.

2. The combination with the reservoir, of a valve-casing arranged therein, and provided with openings for the flow of liquid, an electromagnet arranged above said casing, a valve-rod extending through said magnet and casing and provided with an armature and a valve, a self-closing filling-tube communicating with said casing, a second tube surrounding the filling-tube and insulated therefrom, and an electric circuit adapted to be closed by the rise of the liquid within the bottle being filled, substantially as described.

3. In an apparatus for filling bottles, the combination with a reservoir, of a casing arranged therein, a valve operating in the casing, an electromagnet arranged above the casing and adapted to operate said valve, a filling-tube located below the valve and adapted to enter a bottle, a tube arranged around said filling-tube and insulated therefrom, a battery, the platinum tips on the lower ends of said tube to form the contact-points of the two poles of the battery, and an electrical circuit adapted to be closed by the liquid in the bottle, whereby the valve is operated, substantially as described.

4. In an apparatus for filling bottles, the combination with a reservoir, of a casing arranged therein, a valve operating in the casing, an electromagnet arranged above the casing and adapted to operate said valve, a depending sleeve having an internally-threaded socket on the lower side of said reservoir, a filling-tube arranged to extend through said socket and adapted to be operated upwardly into the casing, a cap for said filling-tube adapted to close the opening in the base of the casing, an outer tube surrounding the filling-tube, a battery and an electrical circuit adapted to be closed by the liquid in the bottle when it touches the ends of said tubes, substantially as and for the purpose described.

5. In an apparatus for filling bottles, the combination with a reservoir having a depending sleeve provided with an internally-threaded socket, a valve-casing arranged in said reservoir and provided at its lower end with an externally-threaded tubular ring fitting into said socket, an annular flange around the upper end of the casing and arranged to rest upon the top of the reservoir, a cover screwed into the top of the casing and extending annularly beyond the same, an electromagnet supported on said cover and comprising a hollow soft-metal core, the wire coils and a base-plate, a rod extending up through the casing and the magnet and carrying an armature on its upper end and a valve on its lower end, a filling-tube supported in the lower end of the casing and provided with a cap, a tube surrounding said filling-tube and insulated therefrom, an annular shoulder secured upon the filling-tube and provided with an upwardly-projecting flange, a coil-spring arranged between said shoulder and the depending sleeve on the reservoir and an electrical circuit adapted to be closed by the rise of liquid in the bottle, substantially as described.

JOSIAH HARVEY FAHRNEY.

Witnesses:
O. R. BARNETT,
M. E. SHIELDS.